United States Patent
Kobayashi et al.

(10) Patent No.: US 10,224,147 B2
(45) Date of Patent: Mar. 5, 2019

(54) MULTILAYER CERAMIC CAPACITOR

(71) Applicant: TAIYO YUDEN CO., LTD., Taito-ku, Tokyo (JP)

(72) Inventors: Satoshi Kobayashi, Takasaki (JP); Takahisa Fukuda, Takasaki (JP); Tomoaki Nakamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 14/903,980

(22) PCT Filed: Jul. 8, 2014

(86) PCT No.: PCT/JP2014/068114
§ 371 (c)(1),
(2) Date: Jan. 8, 2016

(87) PCT Pub. No.: WO2015/005306
PCT Pub. Date: Jan. 15, 2015

(65) Prior Publication Data
US 2016/0172109 A1    Jun. 16, 2016

(30) Foreign Application Priority Data

Jul. 10, 2013  (JP) .................................. 2013-144198

(51) Int. Cl.
*H01G 4/30*  (2006.01)
*H01G 4/12*  (2006.01)
(Continued)

(52) U.S. Cl.
CPC ............... *H01G 4/30* (2013.01); *H01G 4/012* (2013.01); *H01G 4/12* (2013.01); *H01G 4/248* (2013.01)

(58) Field of Classification Search
CPC ............ H01G 4/30; H01G 4/005; H01G 4/38; H01G 4/12; H01G 4/228; H01G 4/35
See application file for complete search history.

(56) References Cited

U.S. PATENT DOCUMENTS

| 5,040,092 A | * | 8/1991 | Katho | ...................... H01G 4/30 361/321.2 |
| 6,819,540 B2 | * | 11/2004 | Allen | ...................... H01G 4/06 361/302 |

(Continued)

FOREIGN PATENT DOCUMENTS

| JP | 6265804 U | 4/1987 |
| JP | H0373421 U | 7/1991 |

(Continued)

OTHER PUBLICATIONS

International Search Report (ISR) dated Oct. 14, 2014, issued for International application No. PCT/JP2014/068114.

*Primary Examiner* — Nguyen T Ha
(74) *Attorney, Agent, or Firm* — Law Office of Katsuhiro Arai

(57) ABSTRACT

In an embodiment, a capacitor body 11 of the multilayer ceramic capacitor 10 has protective parts 11a made of ceramics, capacitance-forming parts 11b comprising multiple internal electrode layers 11b1 stacked together with ceramic layers 11b2 placed in between, and a non-capacitance-forming part 11c made of ceramics, in the order of "protective part 11a—capacitance-forming part 11b—non-capacitance-forming part 11c—capacitance-forming part 11b—protective part 11a" from one side to the other side along the laminating direction, and T2 representing the thickness of each protective part 11a in the laminating direction, T3 representing the thickness of each capacitance-forming part 11b in the laminating direction, and T4 representing the thickness of the non-capacitance-forming part (Continued)

$11c$ in the laminating direction, satisfy the relationship of "$T2<T3\leq T4$."

12 Claims, 2 Drawing Sheets

(51) Int. Cl.
*H01G 4/012* (2006.01)
*H01G 4/248* (2006.01)

(56) References Cited

U.S. PATENT DOCUMENTS

| | | | | |
|---|---|---|---|---|
| 7,092,236 | B2* | 8/2006 | Lee | H01G 4/232 |
| | | | | 361/303 |
| 7,333,318 | B2* | 2/2008 | Hidaka | H01G 4/12 |
| | | | | 361/306.1 |
| 7,916,450 | B2* | 3/2011 | Oh, II | B32B 18/00 |
| | | | | 361/321.2 |
| 8,649,155 | B2* | 2/2014 | Sasaki | H01G 4/002 |
| | | | | 361/303 |
| 8,837,112 | B2* | 9/2014 | Gu | H01G 4/12 |
| | | | | 361/301.2 |
| 2011/0149471 | A1* | 6/2011 | Hur | H01G 4/12 |
| | | | | 361/321.2 |
| 2013/0135789 | A1* | 5/2013 | Kim | H01G 4/12 |
| | | | | 361/321.2 |
| 2014/0002949 | A1* | 1/2014 | Gu | H01G 4/12 |
| | | | | 361/301.4 |
| 2014/0326494 | A1* | 11/2014 | Chung | H01G 4/018 |
| | | | | 174/260 |
| 2015/0096795 | A1* | 4/2015 | Hong | H01G 4/30 |
| | | | | 174/260 |

FOREIGN PATENT DOCUMENTS

| | | |
|---|---|---|
| JP | 0521429 U | 3/1993 |
| JP | 06224071 A | 8/1994 |
| JP | 07335473 A | 12/1995 |
| JP | 08181032 A | 7/1996 |
| JP | 2003022930 A | 1/2003 |
| JP | 2005072452 A | 3/2005 |

* cited by examiner

[Fig.1]
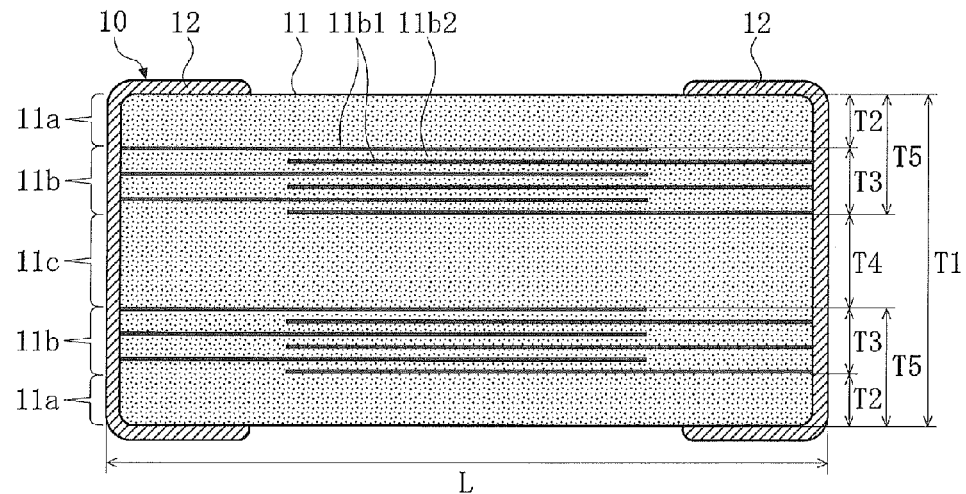
[Fig.2]
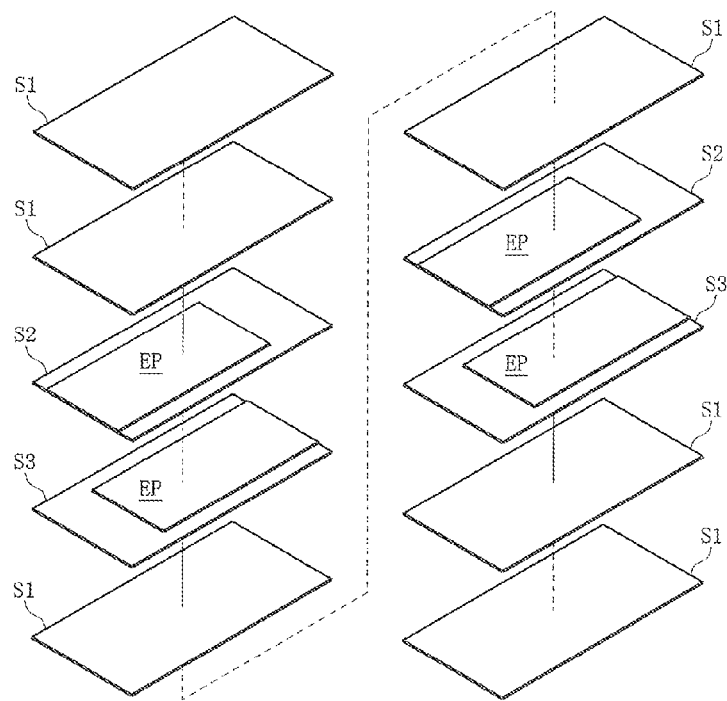

[Fig.3]

| | T1 (mm) | T2 (mm) | T3 (mm) | T4 (mm) | T5 (mm) | T2/T1 | T4/T1 | T5/T1 | T2/L | Deflection strength | Generation of cracks |
|---|---|---|---|---|---|---|---|---|---|---|---|
| Sample 1 | 0.50 | 0.11 | 0.10 | 0.08 | 0.21 | 0.22 | 0.16 | 0.42 | 0.11 | 3.1mm | 10/10 |
| Sample 2 | 0.50 | 0.10 | 0.10 | 0.10 | 0.20 | 0.20 | 0.20 | 0.40 | 0.10 | 4.8mm | 10/10 |
| Sample 3 | 0.50 | 0.09 | 0.10 | 0.12 | 0.19 | 0.18 | 0.24 | 0.38 | 0.09 | 6.7mm | 6/10 |
| Sample 4 | 0.50 | 0.08 | 0.10 | 0.14 | 0.18 | 0.16 | 0.28 | 0.36 | 0.08 | 8.5mm | 3/10 |
| Sample 5 | 0.42 | 0.07 | 0.10 | 0.08 | 0.17 | 0.17 | 0.19 | 0.40 | 0.07 | 5.2mm | 10/10 |
| Sample 6 | 0.48 | 0.09 | 0.10 | 0.10 | 0.19 | 0.19 | 0.21 | 0.40 | 0.09 | 5.9mm | 8/10 |
| Sample 7 | 0.50 | 0.07 | 0.10 | 0.16 | 0.17 | 0.14 | 0.32 | 0.34 | 0.07 | 8.8mm | 2/10 |
| Sample 8 | 0.42 | 0.06 | 0.10 | 0.10 | 0.16 | 0.14 | 0.24 | 0.38 | 0.06 | 5.7mm | 8/10 |
| Sample 9 | 0.30 | 0.07 | 0.06 | 0.04 | 0.13 | 0.23 | 0.13 | 0.43 | 0.12 | 3.2mm | 10/10 |
| Sample 10 | 0.30 | 0.06 | 0.06 | 0.06 | 0.12 | 0.20 | 0.20 | 0.40 | 0.10 | 4.7mm | 10/10 |
| Sample 11 | 0.30 | 0.05 | 0.06 | 0.08 | 0.11 | 0.17 | 0.27 | 0.37 | 0.08 | 6.6mm | 5/10 |
| Sample 12 | 0.30 | 0.04 | 0.06 | 0.10 | 0.10 | 0.13 | 0.33 | 0.33 | 0.07 | 8.3mm | 3/10 |
| Sample 13 | 0.22 | 0.03 | 0.06 | 0.04 | 0.09 | 0.14 | 0.18 | 0.41 | 0.05 | 5.0mm | 10/10 |
| Sample 14 | 0.24 | 0.03 | 0.06 | 0.06 | 0.09 | 0.13 | 0.25 | 0.38 | 0.05 | 5.7mm | 7/10 |
| Sample 15 | 0.30 | 0.03 | 0.06 | 0.12 | 0.09 | 0.10 | 0.40 | 0.30 | 0.05 | 8.5mm | 2/10 |
| Sample 16 | 0.22 | 0.02 | 0.06 | 0.06 | 0.08 | 0.09 | 0.27 | 0.36 | 0.03 | 5.5mm | 6/10 |
| Sample 17 | 0.20 | 0.05 | 0.04 | 0.02 | 0.09 | 0.25 | 0.10 | 0.45 | 0.13 | 3.4mm | 10/10 |
| Sample 18 | 0.20 | 0.04 | 0.04 | 0.04 | 0.08 | 0.20 | 0.20 | 0.40 | 0.10 | 4.6mm | 10/10 |
| Sample 19 | 0.20 | 0.03 | 0.04 | 0.06 | 0.07 | 0.15 | 0.30 | 0.35 | 0.08 | 6.4mm | 6/10 |
| Sample 20 | 0.20 | 0.02 | 0.04 | 0.08 | 0.06 | 0.10 | 0.40 | 0.30 | 0.05 | 8.6mm | 2/10 |
| Sample 21 | 0.12 | 0.01 | 0.04 | 0.02 | 0.05 | 0.08 | 0.17 | 0.42 | 0.03 | 5.2mm | 10/10 |
| Sample 22 | 0.15 | 0.01 | 0.04 | 0.05 | 0.05 | 0.07 | 0.33 | 0.33 | 0.03 | 5.8mm | 7/10 |
| Sample 23 | 0.20 | 0.01 | 0.04 | 0.10 | 0.05 | 0.05 | 0.50 | 0.25 | 0.03 | 8.6mm | 2/10 |

MULTILAYER CERAMIC CAPACITOR

This application is the U.S. National Phase under 35 U.S.C. § 371 of International Application PCT/JP2014/068114, filed Jul. 8, 2014, which claims priority to Japanese Patent Application No. 2013-144198, filed Jul. 10, 2013. The International Application was published under PCT Article 21(2) in a language other than English.

TECHNICAL FIELD

The present invention relates to a multilayer ceramic capacitor.

BACKGROUND ART

A multilayer ceramic capacitor generally has a capacitor body of laminated structure, as well as external electrodes respectively provided on the opposing ends of the capacitor body. The capacitor body has capacitance-forming parts comprising multiple internal electrode layers stacked together with ceramic layers in between, and protective parts made of ceramics that are placed on both sides of the capacitance-forming parts in the laminating direction. In addition, the ends of some of the multiple internal electrode layers are connected to one external electrode, while the ends of the rest are connected to the other external electrode.

This type of multilayer ceramic capacitor requires sufficient deflection strength in order to resist the stress received when it is mounted on a circuit board, etc., as well as the stress received in a mounted state due to thermal shock, etc. It should be noted that this deflection strength is generally expressed by the amount (in mm) by which the jig is pushed in before the multilayer ceramic capacitor experiences a capacitance drop of aspecified percentage or more in the deformation process when the multilayer ceramic capacitor is soldered on one side of the board and then, with the one side supported by a frame, the area corresponding to the capacitor-soldered location on the other side is pressed down with a jig at a constant speed and thus deformed.

Patent Literatures 1 and 2 below each disclose a structure that may be utilized for improving the deflection strength of the multilayer ceramic capacitor. However, both provide dummy electrode layers or metal layers that do not contribute to the formation of capacitance inside the capacitor body, and therefore make the structure of the capacitor body complex.

BACKGROUND ART LITERATURE

Patent Literature

Patent Literature 1: Japanese Patent Laid-open No. Hei 07-335473
Patent Literature 2: Japanese Patent Laid-open No. Hei 08-181032

SUMMARY OF THE INVENTION

Problems to be Solved by the Invention

An object of the present invention is to provide a multilayer ceramic capacitor offering improved deflection strength, without having to provide any dummy electrode layer or metal layer that does not contribute to the formation of capacitance inside the capacitor body.

Means for Solving the Problems

To achieve the aforementioned object, the present invention represents a multilayer ceramic capacitor having a capacitor body of laminated structure as well as external electrodes respectively provided on the opposing ends of the capacitor body, wherein the capacitor body has protective parts made of ceramics, capacitance-forming parts comprising multiple internal electrode layers stacked together with ceramic layers placed in between, and a non-capacitance-forming part made of ceramics, in the order of "protective part—capacitance-forming part—non-capacitance-forming part—capacitance-forming part—protective part" from one side to the other side along the laminating direction, where T2 representing the thickness of each of the protective parts in the laminating direction, T3 representing the thickness of each of the capacitance-forming parts in the laminating direction, and T4 representing the thickness of the non-capacitance-forming part in the laminating direction, satisfy the relationship of "$T2<T3 \leq T4$."

Effects of the Invention

According to the present invention, a multilayer ceramic capacitor offering improved deflection strength can be provided without having to provide any dummy electrode layer or metal layer that does not contribute to the formation of capacitance inside the capacitor body.

The aforementioned and other objects of the present invention, and its characteristics and effects according to each object, are made clear by the following explanations and drawings attached hereto.

BRIEF DESCRIPTION OF THE DRAWINGS

FIG. 1 is a longitudinal section view showing the basic structure of a multilayer ceramic capacitor to which the present invention is applied.

FIG. 2 is a drawing explaining an example of manufacturing the multilayer ceramic capacitor shown in FIG. 1.

FIG. 3 is a table showing the specifications and inspection results of Samples 1 to 23 for effectiveness verification.

MODE FOR CARRYING OUT THE INVENTION

<<Basic Structure of Multilayer ceramic capacitor>>
First, the basic structure of a multilayer ceramic capacitor 10 to which the present invention is applied, is explained by citing FIG. 1.

The multilayer ceramic capacitor 10 has a capacitor body 11 of laminated structure being shaped roughly as a rectangular solid, as well as external electrodes 12 respectively provided on the ends of the capacitor body 11 in the length direction.

The capacitor body 11 has protective parts 11a made of ceramics, capacitance-forming parts 11b comprising multiple internal electrode layers 11b1 stacked together with ceramic layers 11b2 placed in between, and a non-capacitance-forming part 11c made of ceramics, in the order of "protective part 11a—capacitance-forming part 11b—non-capacitance-forming part 11c—capacitance-forming part 11b—protective part 11a" from one side to the other side along the laminating direction. It should be noted that, in FIG. 1, L represents the length of the multilayer ceramic capacitor 10, T1 represents the thickness of the capacitor body 11 in the laminating direction, T2 represents the thickness of each protective part 11a in the laminating direction, T3 represents the thickness of each capacitance-forming part 11b in the laminating direction, T4 represents the thickness of the non-capacitance-forming part 11c in the laminating direction, and T5 represents the sum of T2 and T3.

Each protective part 11a has the same reference value for its thickness T2 in the laminating direction, each capacitance-forming part 11b has the same reference value for its thickness T3 in the laminating direction, each internal electrode layer 11b1 has the same reference value for its thickness, and each ceramic layer 11b2 has the same reference value for its thickness (thickness of the part sandwiched by internal electrode layers 11b1). Each internal electrode layer 11b1 has a rectangular contours (refer to FIG. 2) and has the same reference values for the dimensions specifying its profile. The internal electrode layers 11b1 are staggered in the length L direction, where the ends of some (odd-numbered ones from the top in FIG. 1) are connected to one external electrode 12 (left side in FIG. 1), while the ends of the rest (even-numbered ones in FIG. 1) are connected to the other external electrode 12 (right side in FIG. 1).

The protective parts 11a, ceramic layers 11b2 and non-capacitance-forming part 11c are made of the same material, and for this material, dielectric ceramics containing barium titanate, strontium titanate, calcium titanate, magnesium titanate, calcium zirconate, calcium zirconate-titanate, barium zirconate, titanium oxide, etc., or preferably dielectric ceramics of $\varepsilon>1000$ or Class 2 (high dielectric constant type), is used. The internal electrode layers 11b1 are made of the same material, and for this material, nickel, copper, palladium, platinum, silver, gold, alloy thereof, or other metal is used.

The external electrodes 12 each cover an end face of the capacitor body 11 in the length direction and parts of the four side faces adjoining the end face. Although not illustrated, the external electrodes 12 have a two-layer structure comprising a base film contacting the exterior surface of the capacitor body 11 and a surface film contacting the exterior surface of the base film, or multi-layer structure comprising a base film, surface film and at least one intermediate film in between. The base film is made of a baked metal film, for example, and for its material, nickel, copper, palladium, platinum, silver, gold, or alloy thereof or other metal is used. The surface film is made of a plated metal film, for example, and for its material, tin, palladium, gold, zinc, or other metal is used. The intermediate film is made of a plated metal film, for example, and for its material, platinum, palladium, gold, copper, nickel, or other metal is used.

<<Example of Manufacturing Multilayer ceramic capacitor>> Next, an example of manufacturing the aforementioned multilayer ceramic capacitor 10 is explained by citing FIG. 2.

First, a ceramic slurry containing powder of the aforementioned dielectric ceramics is coated [on a substrate] and then dried to prepare first sheets S1, and an electrode paste containing powder of the aforementioned metal is printed onto the first sheets S1 and then dried to prepare second sheets S2 and third sheets S3 on which electrode patterns EP have been formed. The second sheets S2 and third sheets S3 have their electrode patterns EP offset so that the internal electrode layers 11b1 can be staggered in the length L direction (refer to FIG. 1).

Next, multiple first sheets S1 are stacked together and multiple third sheets S3 and second sheets S2 are alternately stacked on top, after which multiple first sheets S1 are stacked together on top and multiple third sheets S3 and second sheets S2 are alternately stacked on top, after which multiple first sheets S1 are stacked together, and then all of the foregoing are thermally compressed, to produce a sheet laminate.

Next, the sheet laminate is cut to produce unsintered chips each corresponding to the capacitor body 11. While a layer structure corresponding to one capacitor body 11 is shown in FIG. 2, the actual first through third sheets and sheet laminate are intended for multiple-piece forming and therefore the aforementioned electrode patterns EP are formed as matrix or zigzag patterns and by cutting this sheet laminate intended for multiple-piece forming, unsintered chips are produced.

Next, each unsintered chip is sintered (and also binder removed) in an ambience with a temperature profile corresponding to the ceramic slurry and electrode paste.

Next, the electrode paste is applied to the ends of the sintered chip in the length direction and then baked to produce a base film, after which electroplating is performed to produce a surface film, or an intermediate film and surface film, on the base film. It should be noted that the base film can also be produced by applying the aforementioned electrode paste to the ends of the unsintered chip in the length direction and then drying the paste, followed by sintering the dried electrode paste together with the unsintered chip.

<<Specifications of Samples 1 to 23>> Next, the specifications of Samples 1 to 23 for effectiveness verification are explained by citing FIG. 3.

Samples 1 to 23 all having a structure equivalent to that of the aforementioned multilayer ceramic capacitor 10, are produced according to the aforementioned example of manufacturing, and are identical in that: the protective parts 11a, ceramic layers 11b2 and non-capacitance-forming part 11c each use barium titanate; the internal electrode layers 11b1 each use nickel; the external electrodes 12 each have a three-layer structure comprising a nickel base film, copper intermediate film, and tin surface film; and the external electrodes 12 each have a reference thickness value of 0.01 mm.

Samples 1 to 23 are not identical in that: Samples 1 to 8 have a reference length L value of 1.00 mm, Samples 9 to 16 have a reference length L value of 0.60 mm, and Samples 17 to 23 have a reference length L value of 0.40 mm; the capacitance-forming parts 11b (T3=0.10 mm) of Samples 1 to 8 each have 52 internal electrode layers 11b1 (thickness=1 μm) and 51 ceramic layers 11b2 (thickness=1 μm), capacitance-forming parts 11b (T3=0.06 mm) of Samples 9 to 16 each have 32 internal electrode layers 11b1 (thickness=1 μm) and 31 ceramic layers 11b2 (thickness=1 μm), and capacitance-forming parts 11b (T3=0.04 mm) of Samples 17 to 23 each have 22 internal electrode layers 11b1 (thickness=1 μm) and 21 ceramic layers 11b2 (thickness=1 μm); and the reference value of the dimension along the length L of the wrap-around part (part partially covering the four side faces of the capacitor body 11) of each external electrode 12 is 0.25 mm for Samples 1 to 8, 0.15 mm for Samples 9 to 16, and 0.10 mm for Samples 17 to 23. Other points in which the samples are not identical are as shown in the [T1 (mm)] column, [T2 (mm)] column, [T3 (mm)] column, [T4 (mm)] column and [T5 (mm)] column in FIG. 3.

<<Inspection Methods for Samples 1 to 23>> Next, the inspection method used to derive the values in the [Deflection strength] column, and inspection method used to derive the values in the [Generation of cracks] column, in FIG. 3, are explained.

The [Deflection strength] column in FIG. 3 shows the quantity (its unit is "mm") by which the jig is pushed in when the sample experiences a capacitance drop of 12.5% or more in the deformation process where Samples 1 to 23 (10 pieces each) are each soldered onto one side of a glass epoxy board conforming to JIS-C-6484 and then, that one side of the glass epoxy board is supported by a frame at points which are 45 mm away from both sides of the sample-soldered location, and the area corresponding to the sample-soldered location on the opposite side is pressed down with a jig (whose pressurization part consists of a curved surface of 230 mm in radius of curvature) at a constant speed of 0.5 mm/sec and thus deformed.

The [Generation of cracks] column in FIG. 3 shows the number n of cracks generating in the capacitor body 11 of each of Samples 1 to 23 (10 pieces each) as n/10 when the jig pushed-in quantity in the aforementioned deflection strength inspection is increased to twice each deflection strength standard in consideration of the practical deflection strength standard of 5.0 mm for Samples 1 to 8 (L=1.00 mm), practical deflection strength standard of 5.0 mm for Samples 9 to 16 (L=0.60 mm) and practical deflection strength standard of 5.0 mm for Samples 17 to 23 (L=0.40 mm).

<<Inspection Results of Samples 1 to 23 and Consideration Thereof>> In FIG. 3, the [T1] column shows the capacitor body 11 thicknesses of Samples 1 to 23 in the laminating direction, [T2] column shows the protective part 11a thicknesses of Samples 1 to 23 in the laminating direction, [T3] column shows the capacitance-forming part 11b thicknesses of Samples 1 to 23 in the laminating direction, and [T4] column shows the non-capacitance-forming part 11c thicknesses of Samples 1 to 23.

Based on the values of the [Deflection strength] column and those of the [Generation of cracks] column in FIG. 3, Samples 3, 4, 6, 7 and 8, of Samples 1 to 8, all exhibited a deflection strength equal to or greater than their deflection strength standard (5.0 mm) mentioned above and generated fewer than 10/10 cracks, with these Samples 3, 4, 6, 7 and 8 all satisfying the relationship of "T2<T3≤T4." Of Samples 9 to 16, Samples 11, 12, 14, 15 and 16 all exhibited a deflection strength equal to or greater than their deflection strength standard (5.0 mm) mentioned above and generated fewer than 10/10 cracks, with these Samples 11, 12, 14, 15 and 16 all satisfying the relationship of "T2<T3≤T4." Of Samples 17 to 23, Samples 19, 20, 22 and 23 all exhibited a deflection strength equal to or greater than their deflection strength standard (5.0 mm) mentioned above and generated fewer than 10/10 cracks, with these Samples 19, 20, 22 and 23 all satisfying the relationship of "T2<T3≤T4." In other words, excellent deflection strength suitable for practical use can be ensured so long as the relationship of "T2<T3≤T4" is satisfied. In essence, a multilayer ceramic capacitor 10 offering improved deflection strength can be provided without having to provide any dummy electrode layer or metal layer that does not contribute to the formation of capacitance inside the capacitor body 11.

In FIG. 3, the [T2/T1] column, [T4/T1] column, [T5/T1] column and [T2/L] column, in light of the involvement of T2, T3 and T4 in the aforementioned relationship, were created to understand the trends of: T2/T1 (Thickness of the protective part 11a in the laminating direction/Thickness of the capacitor body 11 in the laminating direction); T4/T1 (Thickness of the non-capacitance-forming part 11c/Thickness of the capacitor body 11 in the laminating direction); T5/T1 (Thickness of the protective part 11a in the laminating direction+Thickness of the capacitance-forming part 11b in the laminating direction/Thickness of the capacitor body 11 in the laminating direction); and T2/L (Thickness of the protective part 11a in the laminating direction/Length of the multilayer ceramic capacitor 10). It should be noted that, since Samples 1 to 8 have an identical value of T3 (0.10 mm), Samples 9 to 16 have an identical value of T3 (0.06 mm), and Samples 17 to 23 also have an identical value of T3 (0.04 mm), T5/T1 is adopted in place of T3/T1.

Based on the values of the [T2/T1] column in FIG. 3, Samples 3, 4, 6, 7 and 8 mentioned above all satisfied the relationship of "T2/T1≤19/100." Samples 11, 12, 14, 15 and 16 mentioned above all satisfied the relationship of "T2/T1≤19/100." Samples 19, 20, 22 and 23 mentioned above all satisfied the relationship of "T2/T1≤19/100." In other words, excellent deflection strength suitable for practical use can be ensured so long as the relationship of "T2/T1≤19/100" is satisfied in addition to the foregoing relationship.

Additionally, based on the values of the [T4/T1] column in FIG. 3, Samples 3, 4, 6, 7 and 8 mentioned above all satisfied the relationship of "T4/T1≥21/100." Samples 11, 12, 14, 15 and 16 mentioned above all satisfied the relationship of "T4/T1≥21/100." Samples 19, 20, 22 and 23 mentioned above all satisfied the relationship of "T4/T1≥21/100." In other words, excellent deflection strength suitable for practical use can be ensured so long as the relationship of "T4/T1≥21/100" is satisfied in addition to the foregoing relationships.

Furthermore, based on the values of the [T5/T1] column in FIG. 3, Samples 3, 4, 6, 7 and 8 mentioned above all satisfied the relationship of "T5/T1≤40/100." Samples 11, 12, 14, 15 and 16 mentioned above all satisfied the relationship of "T5/T1≤40/100." Samples 19, 20, 22 and 23 mentioned above all satisfied the relationship of "T5/T1≤40/100." In other words, excellent deflection strength suitable for practical use can be ensured so long as the relationship of "T5/T1≤40/100" is satisfied in addition to the foregoing relationships.

Furthermore, based on the values of the [T2/L] column in FIG. 3, Samples 3, 4, 6, 7 and 8 mentioned above all satisfied the relationship of "T2/L≤9/100." Samples 11, 12, 14, 15 and 16 mentioned above all satisfied the relationship of "T2/L≤9/100." Samples 19, 20, 22 and 23 mentioned above all satisfied the relationship of "T2/L≤9/100." In other words, excellent deflection strength suitable for practical use can be ensured so long as the relationship of "T2/L≤9/100" is satisfied in addition to the foregoing relationships.

DESCRIPTION OF THE SYMBOLS

10—Multilayer ceramic capacitor, 11—Capacitor body, 11a—Protective part, 11b—Capacitance-forming part, 11b1—Internal electrode layer, 11b2—Ceramic layer, 11c—Non-capacitance-forming part, 12—External electrode.

The invention claimed is:
1. A multilayer ceramic capacitor having a capacitor body of laminated structure as well as external electrodes respectively provided on opposing ends of the capacitor body, wherein the capacitor body has:
  upper and lower protective parts made of ceramics and having a thickness of T2 measured from top and bottom surfaces of the capacitor body, respectively, to internal electrode layers closest to the top and the bottom surfaces of the capacitor body, respectively,
  upper and lower capacitance-forming parts each comprising at least 22 internal electrode layers stacked together with ceramic layers placed in between and having a thickness of T3 measured from the internal electrode layers closest to the top and the bottom surfaces of the capacitor body, respectively, to internal electrode layers immediately adjacent to each other across a center of the capacitor body in the thickness direction, respectively, and a non-capacitance-forming part made of ceramics and having a thickness of T4 measured from one of the immediately adjacent internal electrode layers across the center of the capacitor body to the other of the immediately adjacent internal electrode layers across the center of the capacitor body, wherein the foregoing parts are layered_in an order of "lower protective part—lower capacitance-forming part-non-capacitance-forming part—upper capacitance-forming part—upper protective part" from a bottom side to a top side along a laminating direction; and wherein a relationship of "T2<T3≤T4" is satisfied.

2. The multilayer ceramic capacitor according to claim 1, wherein T1 representing a thickness of the capacitor body in the laminating direction, and T2 mentioned above, satisfy a relationship of "T2/T1≤19/100".

3. The multilayer ceramic capacitor according to claim 2, wherein T1 representing a thickness of the capacitor body in the laminating direction, and T4 mentioned above, satisfy a relationship of "T4/T1≥21/100".

4. The multilayer ceramic capacitor according to claim 3, wherein T1 representing a thickness of the capacitor body in the laminating direction, and T5 representing a sum of T2 and T3 mentioned above, satisfy a relationship of "T5/T1≤40/100".

5. The multilayer ceramic capacitor according to claim 3, wherein L representing a length of the multilayer ceramic capacitor, and T2 mentioned above, satisfy a relationship of "T2/L≤9/100".

6. The multilayer ceramic capacitor according to claim 2, wherein T1 representing a thickness of the capacitor body in the laminating direction, and T5 representing a sum of T2 and T3 mentioned above, satisfy a relationship of "T5/T1≤40/100".

7. The multilayer ceramic capacitor according to claim 2, wherein L representing a length of the multilayer ceramic capacitor, and T2 mentioned above, satisfy a relationship of "T2/L≤9/100".

8. The multilayer ceramic capacitor according to claim 1, wherein T1 representing a thickness of the capacitor body in the laminating direction, and T4 mentioned above, satisfy a relationship of "T4/T1≥21/100".

9. The multilayer ceramic capacitor according to claim 8, wherein T1 representing a thickness of the capacitor body in the laminating direction, and T5 representing a sum of T2 and T3 mentioned above, satisfy a relationship of "T5/T1≤40/100".

10. The multilayer ceramic capacitor according to claim 8, wherein L representing a length of the multilayer ceramic capacitor, and T2 mentioned above, satisfy a relationship of "T2/L≤9/100".

11. The multilayer ceramic capacitor according to claim 1, wherein T1 representing a thickness of the capacitor body in the laminating direction, and T5 representing a sum of T2 and T3 mentioned above, satisfy a relationship of "T5/T1≤40/100".

12. The multilayer ceramic capacitor according to claim 1, wherein L representing a length of the multilayer ceramic capacitor, and T2 mentioned above, satisfy a relationship of "T2/L≤9/100".

* * * * *

UNITED STATES PATENT AND TRADEMARK OFFICE
CERTIFICATE OF CORRECTION

PATENT NO. : 10,224,147 B2
APPLICATION NO. : 14/903980
DATED : March 5, 2019
INVENTOR(S) : Satoshi Kobayashi, Takahisa Fukuda and Tomoaki Nakamura It is certified that error appears in the above-identified patent and that said Letters Patent is hereby corrected as shown below:

In the Claims

Column 7, Line 10, in Claim 1, a "_" in the phrase "layered_in an order" should be deleted, and a space should be inserted therefor.

Column 7, Lines 11-12, in Claim 1, in the phrase "lower protective part—lower capacitance-forming part-non-capacitance-forming part—upper capacitance-forming part—upper protective part", the ("-") in front of "non-capacitance-forming part" should be a ("—").

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*